United States Patent [19]

Masse et al.

[11] Patent Number: 5,864,001
[45] Date of Patent: Jan. 26, 1999

[54] POLYURETHANES MADE WITH POLYDIENE DIOLS, DIISOCYANATES, AND DIMER DIOL CHAIN EXTENDER

[75] Inventors: Michael Alan Masse, Richmond; Dale Lee Handlin, Jr., Houston, both of Tex.

[73] Assignee: Shell Oil Company, Houston, Tex.

Related U.S. Application Data

[60] Provisional application No. 60/028,598, Oct. 16, 1996.

[21] Appl. No.: 947,918

[22] Filed: Oct. 9, 1997

[51] Int. Cl.$^6$ .................................................. C08G 18/62
[52] U.S. Cl. .............................................. 528/75; 528/85
[58] Field of Search ........................................ 528/85, 75

[56] References Cited

U.S. PATENT DOCUMENTS

| | | | |
|---|---|---|---|
| 3,427,366 | 2/1969 | Verdol et al. | 260/859 |
| 3,895,149 | 7/1975 | Sheffler et al. | 428/94 |
| 3,987,012 | 10/1976 | Statton | 260/77.5 CR |
| 4,053,446 | 10/1977 | Watabe et al. | 260/37 N |
| 4,107,256 | 8/1978 | Conrad et al. | 264/310 |
| 4,245,081 | 1/1981 | Quiring et al. | 528/65 |
| 4,329,277 | 5/1982 | Murphy | 523/122 |
| 4,371,684 | 2/1983 | Quiring et al. | 528/65 |
| 4,376,834 | 3/1983 | Goldwasser et al. | 521/159 |
| 4,507,430 | 3/1985 | Shimada et al. | 524/839 |
| 4,532,316 | 7/1985 | Henn | 528/59 |
| 4,582,879 | 4/1986 | Frisch et al. | 525/424 |
| 4,603,188 | 7/1986 | Kusakawa et al. | 528/60 |
| 4,705,721 | 11/1987 | Frisch et al. | 428/349 |
| 4,722,946 | 2/1988 | Hostettler | 521/158 |
| 5,013,811 | 5/1991 | Ross | 528/60 |
| 5,167,899 | 12/1992 | Jezic | 264/510 |
| 5,318,813 | 6/1994 | Flexman, Jr. | 428/36.9 |
| 5,344,882 | 9/1994 | Flexman | 525/131 |
| 5,393,843 | 2/1995 | Handlin, Jr. et al. | 525/332.8 |
| 5,405,911 | 4/1995 | Handlin, Jr. et al. | 525/139 |

FOREIGN PATENT DOCUMENTS

| | | | |
|---|---|---|---|
| 0020774 A1 | 10/1979 | European Pat. Off. | C08D 5/00 |
| 0114185 A1 | 8/1983 | European Pat. Off. | C08G 18/69 |
| 0380389 A1 | 1/1990 | European Pat. Off. | C08G 16/65 |
| 0624612 A1 | 4/1994 | European Pat. Off. | C08G 18/62 |
| 2742879 | 4/1979 | Germany | C08G 18/08 |
| 2270317 | 8/1993 | United Kingdom | C08F 8/00 |

*Primary Examiner*—Rachel Gorr
*Attorney, Agent, or Firm*—Donald F. Haas

[57] ABSTRACT

The present invention is polyurethane compositions comprising from 1 to 80% by weight of a polydiene diol having from 1.6 to 2, more preferably 1.8 to 2, and most preferably 1.9 to 2, terminal hydroxyl groups per molecule and a number average molecular weight between 500 and 20,000, more preferably between 1,000 and 10,000, from 20 to 99% by weight of a hard segment comprised of an isocyanate having two isocyanates groups per molecule and dimer diol as a chain extender. The polyurethane compositions described herein are stronger than other polydiene diol-based polyurethane compositions.

8 Claims, No Drawings

POLYURETHANES MADE WITH POLYDIENE DIOLS, DIISOCYANATES, AND DIMER DIOL CHAIN EXTENDER

CROSSREFERENCE TO PRIOR APPLICATION

This application claims the benefit of U.S. Provisional Application No. 60/028,598, filed Oct. 16, 1996.

FIELD OF THE INVENTION

This invention relates to strong polyurethane elastomer compositions containing a polydiene diol and a chain extender which is compatible with the polyurethane composition.

BACKGROUND OF THE INVENTION

Cast and thermoplastic polyurethane compositions based on the reaction of polyisocyanates with polymeric diols are well known for use as elastomers, adhesives, sealants, elastomeric surface coatings, and coatings for metals and plastics.

The polyurethanes of the present invention are based on a polydiene diol, an isocyanate, and a relatively low molecular weight chain extending diol. In this composition the polydiene serves as the soft, rubbery portion of the polyurethane. The diisocyanate and chain extending diol react together to form a rigid segment of the polymer. Because of the reactivity of isocyanates and alcohols, the polydiene is chemically bound at its termini to the hard segments. In this way a segmented block copolymer is formed.

The strength and other physical properties derive from the molecular structure of the segmented block copolymer polyurethane. In their high molecular weight polymerized form, the soft and hard segments are significantly incompatible and segregate into separate domains. In this arrangement the soft segments act as rubbery polymers and they are physically crosslinked through the segregation and vitrification or crystallization of the hard segments. It is important that the incompatibility between hard and soft segments exist in the final high molecular weight form. Without this incompatibility a leathery material would result which would have limited useful applications due to poor low temperature properties and a low upper service temperature.

While it is important for high molecular weight polyurethanes to have incompatibility between hard and soft segments, this strong incompatibility must not extend to the case of the unreacted components. Intimate contact between reactants is required for full chemical reaction and high polymer formation. If the reactants are incompatible, only low molecular weight polyurethanes are achievable and these have low strengths and are not generally useful.

Thus, the most useful segmented block copolymer polyurethanes are ones in which the reactive components demonstrate compatibility but upon reaction and molecular weight advancement segregate into rubbery soft segments and rigid, reinforcing hard segments. It is this balance of compatibility which must be engineered into this multicomponent polymer which yields the excellent physical properties.

Conventional polyurethanes utilize polyester and polyether soft segments. Low molecular weight chain extenders having a suitable balance of compatibility with these polyols are well known. This invention utilizes a saturated polydiene diol which has significantly different compatibility characteristics. The utility of the saturated polydiene diol relates to its excellent thermal, UV and hydrolytic stability as well as its excellent low temperature mechanical properties. The novel composition herein described is comprised of a particular low molecular weight chain extender which exhibits a suitable balance of compatibility and yields polyurethanes of high strength and hardness.

Polyurethane compositions made with polydiene diols and certain diol chain extenders are described in copending commonly assigned U.S. patent application Ser. No. 08/494,639, filed Jun. 23, 1995, entitled "Use of Polydiene Diols in Thermoplastic Polyurethanes," which is herein incorporated by reference. The compositions described therein contained chain extenders which were low molecular weight diols. The purpose of these chain extenders therein and herein is to increase the level of hard segment (the amount of isocyanate plus the amount of chain extender) in the polyurethane composition. There are many applications for these polyurethane compositions that require high hardness and high tensile properties. One example is ski boots which obviously cannot be soft and pliable. The chain extenders described in the above patent application, both polar and apolar, are not very compatible with the polydiene diol and the isocyanate. In order to make compatible compositions with those chain extenders, the level of hard segment, i.e., the amount of isocyanate and chain extender, must be kept relatively low. This limits the resulting hardness and strength achievable in polydiene based polyurethanes. The patent application describes compositions at 22 percent hard segment and 33 percent hard segment. Even with this limitation, a special solvent process is required to make the polar chain extenders such as 1,4-butane diol sufficiently compatible. This process is expensive and involves solvent removal and recovery. Obviously, it would be advantageous to be able to produce these compositions and others of increased strength and hardness without using the solvent method.

It is an object of the present invention to provide thermoplastic polyurethane compositions which are harder and stronger than currently available TPU compositions made with polydiene diols.

SUMMARY OF THE INVENTION

The present invention is polyurethane compositions comprising from 1 to 80% by weight of polydiene diol having from 1.6 to 2, more preferably 1.8 to 2, and most preferably 1.9 to 2, terminal hydroxyl groups per molecule and a number average molecular weight between 500 and 20,000, more preferably between 1,000 and 10,000, from 20 to 99% by weight of a hard segment comprised of an isocyanate having two isocyanates groups per molecule and dimer diol as a chain extender. The molar ratio of isocyanate (NCO) to total OH ranges from 0.9 to 1.1. The polyurethane compositions described herein are harder and stronger than other polydiene diol-based polyurethane compositions at equivalent hard segment content due to the suitable balance of compatibility of dimer diol chain extender and polydiene diol soft segment.

DETAILED DESCRIPTION OF THE INVENTION

The polydiene diols used in this invention are prepared anionically such as described in U.S. Pat. Nos. 5,376,745, 5,391,663, 5,393,843, 5,405,911, and 5,416,168 which are incorporated by reference herein. The polydiene diols have from 1.6 to 2, more preferably from 1.8 to 2, and most preferably from 1.9 to 2 terminal hydroxyl groups per molecule, and a number average molecular weight between 500 and 20,000, more preferably between 1000 and 10,000.

Hydrogenated polybutadiene diols are preferred and these preferably have 1,4-addition between 30% and 70% to minimize viscosity.

Polymerization of the polydiene diols commences with a monolithium or dilithium initiator which builds a living polymer backbone at each lithium site. The conjugated diene is typically 1,3-butadiene or isoprene. The anionic polymerization is done in solution in an organic solvent, typically a hydrocarbon like hexane, cyclohexane or benzene, although polar solvents such as tetrahydrofuran can also be used. When the conjugated diene is 1,3-butadiene and when the resulting polymer will be hydrogenated, the anionic polymerization of butadiene in a hydrocarbon solvent like cyclohexane is typically controlled with structure modifiers such as diethylether or glyme (1,2-diethoxyethane) to obtain the desired amount of 1,4-addition. The optimum balance between low viscosity and high solubility in a hydrogenated polybutadiene polymer occurs in the range of 40–60% 1,4-butadiene content. This butadiene microstructure is achieved during polymerization at 50° C. in cyclohexane containing about 6% by volume of diethylether or about 1000 ppm of glyme.

Anionic polymerization is terminated by addition of a functionalizing agent like those in U.S. Pat. Nos. 5,391,637, 5,393,843, and 5,418,296, which are also incorporated by reference, but preferably ethylene oxide, prior to termination.

The preferred di-lithium initiator is formed by reaction of two moles of sec-butyllithium with one mole of diisopropenylbenzene. This diinitiator is used to polymerize butadiene in a solvent composed of 90% w cyclohexane and 10% w diethylether. The molar ratio of diinitiator to monomer determines the molecular weight of the polymer. The living polymer is then capped with two moles of ethylene oxide and terminated with two moles of methanol to yield the desired polydiene diol.

The polydiene diol can also be made using a monolithium initiator which contains a hydroxyl group which has been blocked as the silyl ether (as in U.S. Pat. Nos. 5,376, 745 and 5,416,168 which are also incorporated by reference). A suitable initiator is hydroxypropyllithium in which the hydroxyl group is blocked as the trimethylsilyl ether. This mono-lithium initiator can be used to polymerize butadiene in hydrocarbon or polar solvent. The molar ratio of initiator to monomer determines the molecular weight of the polymer. The living polymer is then capped with one mole of ethylene oxide and terminated with one mole of methanol to yield the mono-hydroxy polydiene polymer. The silyl ether is then removed by acid catalyzed cleavage in the presence of water yielding the desired dihydroxy polydiene diol.

The polybutadiene diols are hydrogenated such that at least 90%, preferably at least 95%, of the carbon to carbon double bonds in the diols are saturated. Hydrogenation of these polymers and copolymers may be carried out by a variety of well established processes including hydrogenation in the presence of such catalysts as Raney Nickel, nobel metals such as platinum and the like, soluble transition metal catalysts and titanium catalysts as in U.S. Pat. No. 5,039,755 which is also incorporated by reference. A particularly preferred catalyst is a mixture of nickel 2-ethylhexanoate and triethylaluminum.

The polybutadiene polymer should have no less than about 40% 1,2-butadiene addition because, after hydrogenation, the polymer will be a waxy solid at room temperature if it contained less than about 40% 1,2-butadiene addition. To minimize viscosity of the diol, the 1,2-butadiene content should be between about 40 and 60%. The isoprene polymers have no less than 80% 1,4-isoprene addition in order to reduce Tg and viscosity. The diene microstructures are typically determined by $^{13}C$ nuclear magnetic resonance (NMR) in chloroform.

The polydiene diols have hydroxyl equivalent weights between about 250 and about 10,000, preferably between 500 and 5,000. Thus, for di-hydroxy polydiene polymers, suitable number average molecular weights will be between 500 and 20,000, preferably between 1,000 and 10,000.

The molecular weights of linear polymers or unassembled linear segments of polymers such as mono-, di-, triblock, etc., or the arms of star polymers before coupling are conveniently measured by gel permeation chromatography (GPC), where the GPC system has been appropriately calibrated, in this case by polybutadiene standards for anionically polymerized linear polymers, the polymer is essentially monodisperse (weight average molecular weight/ number average molecular weight ratio approaches unity), and it is both convenient and adequately descriptive to report the "peak" molecular weight of the narrow molecular weight distribution observed. Usually, the peak value is between the number and the weight average. The peak molecular weight is the molecular weight of the main species shown on the chromatograph. For polydisperse polymers the number average molecular weight should be calculated from the chromatograph and used. The materials used in the columns of the GPC are styrene-divinylbenzene gels or silica gels, the solvent is tetrahydrofuran and the detector is a refractive index detector.

The isocyanate used in this invention are diisocyanates having a functionality of two isocyanate groups per molecule, since they produce thermoplastic polyurethane compositions when combined with a true diol. Examples of suitable diisocyanates are 4,4'-diphenylmethane diisocyanate, mixtures of isomers of diphenylmethane diisocyanate, toluene diisocyanate, isophoronediisocyanate, hexamethylenediisocyanate, ethylenediisocyanate, paraphenyl diisocyanate, etc.

The composition of the present invention must contain dimer diol as a chain extender. Dimer diol is a relatively high molecular weight (approximately $C_{36}$) diol which is derived from dimer acid. A dimer acid is a high molecular weight dibasic acid which is liquid (or viscous), stable, and resistant to high temperatures, and which polymerizes with alcohols and polyols to yield a variety of products such as plasticizers, lubricating oils, and hydraulic fuels. It is produced by dimerization of unsaturated fatty acids at mid molecule and usually contains 36 carbon atoms. Dimer diol is a commercial product from Henkel.

The dimer diol chain extender is a critical aspect of the present invention because it is suitably compatible with the polydiene and polyurethane components of the polydiene polyurethane compositions of the present invention. It is so compatible that it can be incorporated into the polyurethane compositions at levels up to 90 percent hard segment or greater without requiring special solvent-based processing techniques which are required for the commonly used low molecular weight polar diol chain extenders described in more detail below. It is theorized that dimer diol is more compatible because the overall contribution of the terminal hydroxy groups to the molecule's polarity is low because it is carried by a relatively large ($C_{36}$) aliphatic backbone.

The percentage of hard segment in the polyurethane composition is important because it determines the strength, hardness, and rigidity of the final polyurethane. It is increased by incorporating a larger proportion of diisocyanate and chain extender. Commonly, these hard segment components are polar and only marginally compatible with other aliphatic components. The user of dimer diol allows construction of saturated polyurethanes of high hardness and strength and polarity because of the decreased polarity of this chain extender and the resulting compatibility with saturated polydiene polyols.

The advantages of the dimer diol begin to become dramatically apparent when the hard segment content of the polyurethane composition is 30% or greater. Dimer diol is much more compatible with the polydiene diol at such concentrations than are the other chain extenders discussed herein. Furthermore, the dimer diol can be used to increase the hard segment content of the composition to as much as 90% or greater.

The dimer diol chain extender is also very useful in increasing the compatibility of other previously used chain extenders which are basically incompatible with these polyurethane compositions and require special processing to get them to fully react with the other components. Examples of such incompatible polar chain extenders include linear chain extenders without carbon side chains such as 1,4-butane diol, 1,3-propane diol, ethylene diamine, 1,6-hexane diol, and the like. Such incompatible chain extenders may comprise from 1 to 90% by weight of the total chain extender present. Other branched chain extenders may also be included but they will not help increase the crystallinity of the polyurethane composition as the linear chain extender will. They will help to increase the hardness and strength in a similar fashion to the dimer diol. Such branched chain extenders include low molecular weight diols which have methyl, ethyl, or higher carbon side chains which make these diols less polar and therefore more compatible with the apolar hydrogenated polydienes. Examples of such chain extenders are 2-ethyl-1,3-hexanediol (PEP diol), 1,2-propane diol, 2-ethyl-2-butyl 1,3 propane diol (BEP diol), and 2,2,4-trimethyl-1,3-pentane diol (TMP diol).

A preferred way to make thermoplastic polyurethanes is by the prepolymer method where the isocyanate component is reacted first with the polydiene diol to form an isocyanate terminated prepolymer, which can then be reacted further with dimer diol and any other chain extender of choice. The polyurethane compositions can be formulated to make elastomers using a solventless prepolymer method.

In the solventless prepolymer method, the polydiene diol is heated to at least 70° C. and not more than 100° C., and then mixed with the desired amount of isocyanate for at least 30 minutes under nitrogen flow. The desired amount of dimer diol and other chain extender is added and thoroughly mixed. The mixture is then poured into a heated mold treated with a mold release compound. The polyurethane composition is formed by curing in the mold for several hours at 90° to 110° C.

A second preferred way to make thermoplastic polyurethanes is by the one-shot method. In this method the polydiene diol and chain extending diols are mixed and heated to 90° C. to 100° C. The diisocyanate is heated separately to 70° C. to 80° C. The diisocyanate is introduced to the polydiene diol plus chain extending diol mixture and this multicomponent mixture is stirred vigorously for 1 minute. The reacting mixture is poured into a teflon coated mold which is preheated to 105° C. and 20,000 psi pressure and held in this condition for 1 hour. The resulting polyurethane is then post-cured at ambient pressure and 105° C. for 16 hours.

The polymerization process can be conducted in the presence of catalysts. Catalysts useful in accelerating the NCO/OH reaction are tertiary amines such as tetramethyl butane diamine, and triethylamine, pyridine, 1,4-diaza(2,2,2)bicyclo-octane and organometallic compounds such as tin diotoate and dibutyl tin dilaurate. These catalysts are used at levels ranging from 0.001% by weight to 1.0% by weight.

A wide variety of fillers can be used in formulations with the present invention. Suitable fillers include calcium carbonate, clays, talcs, zinc oxide, titanium dioxide, silica and the like. The amount of filler usually is in the range of 0 to about 800 phr, depending on the type of filler used and on the application for which the formulation is intended. Preferred fillers are silica and titanium dioxide. The filler should be thoroughly dried in order that adsorbed moisture will not interfere with the reaction between the polyisocyanate and the saturated, polyhydroxylated polydiene polymer.

Stabilizers known in the art may also be incorporated into the composition. These may be for protection during the life of the product against, for example, oxygen, ozone and ultra-violet radiation. These may also be for stabilization against thermo-oxidative degradation during elevated temperature processing. Antioxidants and UV inhibitors which interfere with the urethane curing reaction must be avoided. Preferred antioxidants are the sterically hindered phenolic compounds like butylated hydroxy toluene. Preferred UV inhibitors are UV absorbers such as benzotriazole compounds. The amount of stabilizer in the formulation will depend greatly on the intended application of the product. If processing and durability requirements are modest, the amount of stabilizer in the formulation will be less than about 1 phr. If the polyurethane will be mixed at high temperature or if the product must survive many years in service, stabilizer concentration could be as much as about 10 phr.

DETAILED DESCRIPTION OF PREFERRED EMBODIMENTS

The preferred embodiment of the present invention is a composition for making thermoplastic polyurethanes comprising 1 to 80% by weight of a hydrogenated polybutadiene diol having from 1.9 to 2.0 terminal hydroxyl groups per molecule, 1,4-addition between 40% and 60%, and a number average molecular weight between 1,000 and 10,000, and 20 to 99% by weight hard segment components comprising an isocyanate having two isocyanate groups per molecule and dimer diol such that an overall NCO/OH molar ratio of 0.9 to 1.1 exists. The polyurethane compositions made from fully hydrogenated polybutadiene diols have improved physical properties in comparison to polyurethane compositions containing partially hydrogenated polyisoprene polyols, and are thermoplastic polyurethanes.

A second preferred embodiment of the present invention is a composition for making thermoplastic polyurethanes comprising from 1 to 80% by weight of a hydrogenated polybutadiene diol having from 1.9 to 2.0 terminal hydroxyl groups per molecule, 1,4-addition between 40% and 60%, and a number average molecular weight between 1000 and 10,000, and 20 to 99% by weight of a hard segment component comprising an isocyanate having two isocyanate groups per molecule and a mixed chain extender composed of dimer diol plus one or more diols from the group consisting of 2-ethyl-1,3-hexane diol, 2,2,4-trimethyl-1,3-pentane diol, 2-ethyl-2-butyl-1,3-propane diol, 1,4-butane diol, and 1,6-hexane diol, such that an overall NCO/OH molar ratio of 0.9 to 1.1 exists.

EXAMPLES

A linear, hydrogenated butadiene diol polymer having 1.93 terminal hydroxyl groups per molecule, a number average molecular weight of 3400, and a 1,2-addition of butadiene of 50%, was used. This polymer is a viscous liquid at 25° C. but flows readily at slightly elevated temperatures (2500 centipoise viscosity at 60° C.). This long chain diol was dried by heating it to 90° C. under a nitrogen flow for several hours before reacting it. This was carried out in a 500 milliliter glass reaction kettle.

The isocyanate used was 4,4'-diphenylmethane diisocyanate (MDI). It was obtained from Aldrich Chemical in flaked form and was stored in a freezer prior to use. The diisocyanate was handled in a nitrogen filled dry box when dispensing it. The dimer diol was obtained from Henkel and was dried using molecular sieves. The chain extending short chain diols were dried in a vacuum at 50°–60° C. for 2–3 hours before use.

The thermoplastic polyurethanes were synthesized using the prepolymer method. All of the diisocyanate required was added to the dried hot polymer. The reaction between long chain diol and diisocyanate was carried out at 90° C. for 90 minutes. During the course of the reaction, the viscous mixture was stirred continuously using a high torque air driven mechanical stirrer. At the end of the prepolymer synthesis, a mass of prepolymer was added to a preheated glass jar. The required amount of hot chain extending diol, dimer diol alone or in combination with another diol, was then added to the prepolymer and stirred using a high speed Cafcamo mixer. This was carried out for two to three minutes and then the mixture was poured into a release agent-coated aluminum pan. The polyurethane cure was completed in a vacuum at 90° C. for 16 hours. The overall molar ratio of NCO/OH was 1.00 in all cases.

Samples for mechanical testing were prepared by melt pressing the thermoplastic polyurethane at 150° to 170° C. in a Carver press. Samples having a thickness of 12 mil were prepared for dynamic mechanical testing (DMA) and tensile testing. The tensile strength and elongation results were not significantly different when measured on ⅛ inch thick samples. The hardness measurements were made on ⅛ inch thick samples stacked to a ¼ inch thickness. The results are shown in the accompanying tables.

The dynamic mechanical tests were performed using an Imass Rheovibron operated at 11 Hz. The dynamic response of the material was measured from −100° C. to 200° C. The low temperature soft segment $T_g$ was indicated by the maximum in the tan decta as the material warmed from the fully vitrified state. The flow temperature was defined as the temperature at which the elastic modulus began its precipitous drop accompanying softening of the hard segment.

Tensile properties were measured using an Instron tensile tester. An elongation rate of 10 inches/minute was used.

Hardness was measured using a durometer fitted with a Shore A probe. Values were recorded instantly upon probe-sample contact and after a 10 second relaxation time.

Example 1

Thermoplastic polyurethanes were made by the prepolymer method as generally described using pure dimer diol as the chain extender. Polyurethanes containing hard segments of 22, 30, 37.5, 45, 80, and 90% by weight were prepared. The physical properties of the resulting polymers are listed under entries PU1 through PU6 in Table 1. The suitable balance of compatibility achieved in this system allowed incorporation of hard segment contents as high as 90% by weight. The resulting strength ranged from 80 psi at 22% hard segment to 3911 psi at 80% hard segment. Instantaneous Shore A hardness ranged from 48 at 22% hard segment to 87 at 90% hard segment.

Comparative Example 1

Thermoplastic polyurethanes were made by the prepolymer method as generally described using pure butyl-ethyl-propane diol as the chain extender. Polyurethanes containing 22, 30, 45, and 80% hard segment by weight were prepared. The physical properties of the resulting polymers are listed under entries PUA through PUD in Table 1. While low hard segment contents exhibited good physical properties, hard segment content above 45% showed poor compatibility and poor properties. The maximum observed strength of 3350 psi occurs at 30% hard segment. At 45% hard segment the strength decreases to 1700 psi and further decreases to 380 psi at 80% hard segment.

Comparative Example 2

Thermoplastic polyurethanes were made by the prepolymer method as generally described using pure butane diol as the chain extender. Polyurethanes containing 20, 25, and 30% hard segment by weight were prepared. The physical properties of the resulting polymers are listed under entries PUE through PUG in Table 1. Only low amounts of hard segment can be incorporated in this system before the poor compatibility limits the extent of reaction and the resulting physical properties. The highest strength (1180 psi) was achieved at 20% hard segment. As the hard segment content was increased to 25% and 30% the strength was reduced to 980 psi and 170 psi respectively.

TABLE 1

Physical Properties of Polyurethane Elastomers Having a Single Chain Extending Diol

| Polymer | Hard Segment Content (%) | Dimer Diol Content (% wt) | Low Tg (°C.) | Flow temp (°C.) | Tensile Strength (psi) | Tensile Elongation (%) | Instantaneous Hardness Shore A | 10 Second Hardness Shore A |
|---|---|---|---|---|---|---|---|---|
| PU1 | 22.0 | 100 | −36 | 50 | 80 | 870 | 48 | 37 |
| PU2 | 30.0 | 100 | −37 | 60 | 150 | 880 | 54 | 46 |
| PU3 | 37.5 | 100 | −36 | 80 | 730 | 1040 | 72 | 66 |
| PU4 | 45.0 | 100 | −40 | 84 | 750 | 850 | 67 | 60 |
| PU5 | 80.0 | 100 | 37 | 125 | 3911 | 440 | 87 | 86 |
| PU6 | 90.0 | 100 | 44 | 60 | 1550 | 250 | 87 | 87 |
| PUA | 22.0 | 0* | −37 | 118 | 1940 | 820 | 56 | 51 |

TABLE 1-continued

Physical Properties of Polyurethane Elastomers Having a Single Chain Extending Diol

| Polymer | Hard Segment Content (%) | Dimer Diol Content (% wt) | Low Tg (°C.) | Flow temp (°C.) | Tensile Strength (psi) | Tensile Elongation (%) | Instantaneous Hardness Shore A | 10 Second Hardness Shore A |
|---|---|---|---|---|---|---|---|---|
| PUB | 30.0 | 0* | −36 | 141 | 3350 | 540 | 69 | 66 |
| PUC | 45.0 | 0* | −35 | 110 | 1700 | 300 | 61 | 61 |
| PUD | 80.0 | 0* | −36 | 30 | 380 | 16 | 76 | 73 |
| PUE | 20.0 | 0+ | −37 | 160 | 1180 | 490 | 57 | 55 |
| PUF | 25.0 | 0+ | −38 | 165 | 950 | 360 | 67 | 66 |
| PUG | 30.0 | 0+ | −37 | 97 | 170 | 150 | 63 | 57 |

*chain extended with pure butyl-ethyl-propane diol (BEPD)
+chain extended with pure butane diol

Example 2

Thermoplastic polyurethanes were made by the prepolymer method as generally described using a mixture of dimer diol and butyl-ethyl-propane diol. Hard segment content ranged from 30 to 45% by weight. The dimer diol made up 50 or 75% by weight of the required mass of chain extender. The compositions and resulting properties of these polyurethanes are listed under entries PU7 through PU11 in Table 2. The compatibilizing effect of dimer diol is seen by comparison of the properties of PU11 which had 45% hard segment with a 75/25 mixture of dimer diol/BEP diol and PUC of Table 1 which had 45% hard segment with 100% BEP diol. The improved compatibility of this blend of chain extenders results in improved strength and elongation.

Example 3

A thermoplastic polyurethane was made by the prepolymer method as generally described using a mixture of dimer diol and butane diol. The hard segment content was 30% by weight. Dimer diol made up 50% by weight of the required mass of chain extender. The resulting physical properties are listed under entry PU12 in Table 2. The compatibility effect of dimer diol is seen by comparing the properties of PU12 and PUG of Table 1 which had 30% hard segment with 100% butane diol. The presence of the dimer diol allowed a further extent of reaction and this resulted in significantly increased flow temperature, strength, and elongation.

Example 4

A second linear, hydrogenated butadiene diol polymer was made by dilithium initiation using sec-butyl lithium and diisopropenyl benzene as the initiator system. The molecular weight of the diol was 3525 measured by hydrogen NMR. The hydroxyl equivalent weight was 2060 g/mol OH. This polymer was used to make a polyurethane according to the prepolymer procedure described in the foregoing examples. The polyurethane had a hard segment content of 30 percent by weight, a dimer diol content of 50 percent, the remainder being BEP diol. The tensile strength of the polyurethane was measured at 2610 psi. The tensile elongation was measured at 790 percent, the instantaneous hardness, Shore A was 64 and the 10 seconds hardness, Shore A, was 57.

We claim:

1. A compatible composition for making thermoplastic polyurethanes, comprising:
   (a) from 1 to 80% by weight of a polydiene diol having from 1.6 to 2 terminal hydroxyl groups per molecule and a number average molecular weight between 500 and 20,000;
   (b) from 20 to 99% by weight of a hard segment comprised of an isocyante having two isocyanate groups per molecule and dimer diol as a chain extender; and
   (c) an additional chain extender which is, by itself, incompatible with the polydiene diol, the isocyanate compound, and/or mixtures thereof.

2. The composition of claim 1 wherein the polydiene diol has from 1.9 to 2 hydroxyl groups per molecule.

3. The composition of claim 1 wherein the polydiene diol has a number average molecular weight between 1,000 and 10,000.

TABLE 2

Physical Properties of Polyurethane Elastomers Having a Mixed Chain Extending Diol

| Polymer | Hard Segment Content (%) | Dimer Diol Content (% wt) | Low Tg (°C.) | Flow temp (°C.) | Tensile Strength (psi) | Tensile Elongation (%) | Instantaneous Hardness Shore A | 10 Second Hardness Shore A |
|---|---|---|---|---|---|---|---|---|
| PU7 | 30.0 | 50* | −36 | 110 | 1980 | 700 | 65 | 58 |
| PU8 | 30.0 | 75* | −37 | 107 | 2210 | 750 | 69 | 59 |
| PU9 | 37.5 | 50* | 33 | 123 | 2110 | 520 | 74 | 68 |
| PU10 | 37.5 | 75* | −35 | 91 | 1000 | 780 | 64 | 54 |
| PU11 | 45.0 | 75* | −37 | 96 | 2230 | 590 | 77 | 68 |
| PU12 | 30.0 | 50+ | −36 | 173 | 3043 | 710 | 58 | 51 |

*remainder BEP diol
+remainder butane diol

4. The composition of claim 1 wherein the polydiene diol is a hydrogenated polybutadiene diol.

5. The composition of claim 1 wherein the polydiene diol is a hydrogenated polyisoprene diol.

6. The composition of claim 1 wherein the additional chain extender is selected from the group consisting of butane diol, propane diol, butyl-ethyl-propane diol, trimethyl pentane diol, and hexane diol.

7. The composition of claim 1 wherein the overall NCO to OH molar ratio ranges from 0.9 to 1.1.

8. The composition of claim 1 wherein the isocyanate is selected from the group 4,4'-diphenylmethane diisocyanate, toluene diisocyanate, isophorone diisocyanate, hexamethylene diisocyanate, ethylene diisocyanate, and paraphenyl diisocyanate.

* * * * *